(12) United States Patent
Liu et al.

(10) Patent No.: US 10,663,829 B2
(45) Date of Patent: May 26, 2020

(54) BLUE LIGHT-BLOCKING STRUCTURE AND MANUFACTURING METHOD THEREOF, DISPLAY DEVICE AND OPERATION METHOD THEREOF

(71) Applicants: BOE Technology Group Co., Ltd., Beijing (CN); Hefei BOE Optoelectronics Technology Co., Ltd., Hefei (CN)

(72) Inventors: Yuqi Liu, Beijing (CN); Yuanhui Guo, Beijing (CN); Jia Liu, Beijing (CN); Bingbing Wu, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 92 days.

(21) Appl. No.: 16/130,465

(22) Filed: Sep. 13, 2018

(65) Prior Publication Data
US 2019/0187530 A1    Jun. 20, 2019

(30) Foreign Application Priority Data
Dec. 15, 2017   (CN) .......................... 2017 1 1349853

(51) Int. Cl.
*G02F 1/15*    (2019.01)
*G02F 1/1503*    (2019.01)
(Continued)

(52) U.S. Cl.
CPC ............. *G02F 1/1503* (2019.01); *G02B 5/20* (2013.01); *G02B 5/285* (2013.01); *G02F 1/15* (2013.01);
(Continued)

(58) Field of Classification Search
CPC .......... G02F 1/1503; G02F 1/155; G02F 1/19; G02F 1/15; G02F 1/1523;
(Continued)

(56) References Cited

U.S. PATENT DOCUMENTS

2006/0279833 A1* 12/2006 Yoshimura ............. B82Y 10/00
359/321
2012/0287481 A1* 11/2012 Shimizu ............... G02B 26/101
358/474
(Continued)

FOREIGN PATENT DOCUMENTS

CN    102081243 A    6/2011
CN    103018931 A    4/2013
(Continued)

OTHER PUBLICATIONS

Ding, et al., "The Effect of Temperature on the PL Spectra of High Power LED", Beijing University of Technology, Ministry of Education, Beijing 100124, China, Jun. 2011, pp. 1450-1453.
(Continued)

*Primary Examiner* — Wen Huang
(74) *Attorney, Agent, or Firm* — Banner & Witcoff, Ltd.

(57) ABSTRACT

A blue light-blocking structure and manufacturing method thereof, a display device and an operation method thereof are provided. The blue light-blocking structure includes a first transparent dielectric layer, a second transparent dielectric layer and an electro-refractive index adjusting layer. The second transparent dielectric layer is provided on a side of the first transparent dielectric layer. The electro-refractive index adjusting layer is provided between the first transparent dielectric layer and the second transparent dielectric layer. The electro-refractive index adjusting layer is configured to change the refractive index to the blue light transmitted through the electro-refractive index adjusting layer under the action of an electrical field applied between a first (Continued)

side of the electro-refractive index adjusting layer near the first transparent dielectric layer and a second side near the second transparent dielectric layer.

17 Claims, 7 Drawing Sheets

(51) Int. Cl.
*G02B 5/28* (2006.01)
*G02B 5/20* (2006.01)

(52) U.S. Cl.
CPC ...... *G02F 2201/08* (2013.01); *G02F 2201/50* (2013.01); *G02F 2202/42* (2013.01); *G02F 2203/055* (2013.01)

(58) Field of Classification Search
CPC ..... G02F 2001/133614; G02F 2201/08; G02F 2201/086; G02F 2201/50; G02F 2201/501; G02F 2202/022; G02F 2202/42; G02F 2203/055; G02F 2203/62; B29D 11/00634; G02B 5/20; G02B 5/285
See application file for complete search history.

(56) References Cited

U.S. PATENT DOCUMENTS

| 2014/0168562 | A1 | 6/2014 | Feng et al. |
| 2017/0293057 | A1 | 10/2017 | Gao et al. |
| 2018/0088367 | A1* | 3/2018 | Zhong ................... G02F 1/1323 |
| 2019/0006628 | A1 | 1/2019 | Huang et al. |

FOREIGN PATENT DOCUMENTS

| CN | 204331240 U | 5/2015 |
| CN | 204925434 U | 12/2015 |
| CN | 204964945 U | 1/2016 |
| CN | 105633116 A | 6/2016 |
| CN | 106299145 A | 1/2017 |
| CN | 106405921 A | 2/2017 |
| JP | 2003279914 A | 10/2003 |

OTHER PUBLICATIONS

Feb. 3, 2020-(CN) First Office Action Appn 201711349853.6 with English Translation.

* cited by examiner

BLUE LIGHT-BLOCKING STRUCTURE AND MANUFACTURING METHOD THEREOF, DISPLAY DEVICE AND OPERATION METHOD THEREOF

CROSS REFERENCE TO RELATED APPLICATIONS

This application claims priority to and the benefit of Chinese Patent Application No. 201711349853.6 filed on Dec. 15, 2017, which application is incorporated herein in its entirety.

TECHNICAL FIELD

Embodiments of the present disclosure relate to a blue light-blocking structure and a manufacturing method thereof, a display device and an operation method thereof

BACKGROUND

Blue light is the most energetic light in visible light closest to ultraviolet light. High-energy short-wave blue light, that is, blue light with a wavelength of about 410 nm-470 nm, can cause damage to the human eyes. High-energy short-wave blue light can penetrate the lentis and the vitreous body of the human eyes, directly reach the most important macular area of the retina, damage the photoreceptor cells of the retina and accelerate the oxidation of cells in the macular area, and is therefore called dangerous visible light.

Electronic products, such as displays, mobile phones and tablets that are used by people's lives will emit a lot of blue light. For example, most liquid crystal display (LCD) devices currently adopt light-emitting diode (LED) backlight, and light emitted by the device contains a large amount of blue light. Related blue light-blocking technology may cause the screen to display a yellowish color and affects the display effect.

SUMMARY

At least one embodiment of the present disclosure provides a blue light-blocking structure, comprising: a first transparent dielectric layer; a second transparent dielectric layer provided on a side of the first transparent dielectric layer; and an electro-refractive index adjusting layer provided between the first transparent dielectric layer and the second transparent dielectric layer. The electro-refractive index adjusting layer is configured to change the refractive index to blue light transmitted through the electro-refractive index adjusting layer under the action of an electrical field applied between a first side of the electro-refractive index adjusting layer near the first transparent dielectric layer and a second side near the second transparent dielectric layer.

For example, the refractive index of the electro-refractive index adjusting layer to the blue light under the condition of not applying the electrical field is substantially equal to the refractive indexes of the first transparent dielectric layer and the second transparent dielectric layer to the blue light, respectively; and the refractive index of the electro-refractive index adjusting layer to the blue light under the action of the applied electrical field is increased with the increasement of the electrical field intensity.

For example, the refractive index of the electro-refractive index adjusting layer to the blue light under the condition of not applying the electrical field is less than the refractive index of the first transparent dielectric layer to the blue light and less than the refractive index of the second transparent dielectric layer to the blue light; and the refractive index of the electro-refractive index adjusting layer to the blue light under the action of the applied electrical field is increased with the increasement of the electrical field intensity.

For example, the blue light-blocking structure further comprises: a first electrode provided on a side of the first transparent dielectric layer away from the electro-refractive index adjusting layer, and a second electrode provided on a side of the second transparent dielectric layer away from the electro-refractive index adjusting layer, wherein the first electrode and the second electrode are configured to apply the electrical field to the electro-refractive index adjusting layer.

For example, the first transparent dielectric layer is multiplexed as a first electrode; the second transparent dielectric layer is multiplexed as a second electrode; and the first electrode and the second electrode are configured to apply the electrical field to the electro-refractive index adjusting layer.

For example, the electro-refractive index adjusting layer comprises material including inorganic electrochromic material, or organic electrochromic material.

For example, the material of the electro-refractive index adjusting layer comprises pyrazoline, viologen or phosphotungstic acid.

At least one embodiment of the present disclosure provides a display device, comprising the blue light-blocking structure.

For example, the display device further comprises a display panel. The blue light-blocking structure is provided on a light-emergent side or a light incident side of the display panel.

For example, the display device further comprises a display panel and a backlight provided on a light incident side of the display panel. The blue light-blocking structure is provided between the backlight and the display panel.

For example, the display device further comprises a display panel. The blue light-blocking structure is provided in the display panel.

For example, the display panel comprises an array substrate, the array substrate comprising a base substrate and a display driver circuit layer, and the blue light-blocking structure being provided between the base substrate and the display driver circuit layer.

For example, the display panel comprises a plurality of pixel units, each pixel unit comprising a red subpixel, a green subpixel and a blue subpixel, and the electro-refractive index adjusting layer being arranged corresponding to the blue subpixel.

For example, the display device further comprises a control circuit configured to control the intensity of the electrical field applied to the electro-refractive index adjusting layer.

For example, the display device further comprises an insulating layer provided between the blue light-blocking structure and the display panel.

For example, the display device further comprises an insulating layer provided between the display driver circuit layer and the display panel.

At least one embodiment of the present disclosure provides method for operating a display device, comprising: providing the display device, the display device comprising the blue light-blocking structure; and changing the refractive index of the electro-refractive index adjusting layer to the blue light by adjusting a voltage applied between the first side and the second side of the electro-refractive index adjusting layer, and turning on the blue light-blocking function, or turning off the blue light-blocking function, or adjusting and controlling the transmittance of blue light.

At least one embodiment of the present disclosure provides a method for manufacturing a blue light-blocking structure, comprising: forming a first transparent dielectric layer; forming an electro-refractive index adjusting layer on a side of the first transparent dielectric layer; and forming a second transparent dielectric layer on a side of the electro-refractive index adjusting layer. When an electrical field is applied between a first side near the first transparent dielectric layer and a second side near the second transparent dielectric layer, the refractive index of the electro-refractive index adjusting layer to blue light transmitted through the electro-refractive index adjusting layer is adjusted, to allow the refractive index of the electro-refractive index adjusting layer to the blue light transmitted through the electro-refractive index adjusting layer to be converted to be higher or lower than the refractive indexes of the first transparent dielectric layer and the second transparent dielectric layer to the blue light, respectively.

For example, forming a first electrode on a side of the first transparent dielectric layer away from the electro-refractive index adjusting layer; and forming a second electrode on a side of the second transparent dielectric layer away from the electro-refractive index adjusting layer.

For example, the first transparent dielectric layer is multiplexed as a first electrode; the second transparent dielectric layer is multiplexed as a second electrode; and the first electrode and the second electrode are configured to apply the electrical field to the electro-refractive index adjusting layer.

BRIEF DESCRIPTION OF THE DRAWINGS

Brief description will be given below to the accompanying drawings of the embodiments to provide a more clear understanding of the technical proposals of the embodiments of the present disclosure. It is apparent that the drawings described below only involve some embodiments of the present disclosure but are not intended to limit the present disclosure.

DETAILED DESCRIPTION

Figure 1A:
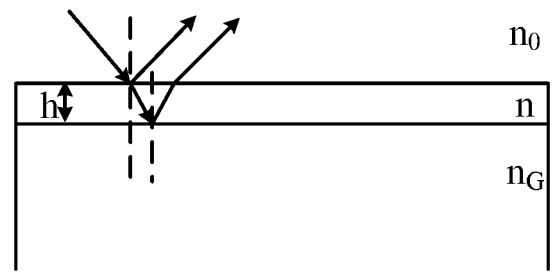
FIG. 1A is a schematic diagram of a single-layer reflection enhancing layer.

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, one of ordinary in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "inner," "outside," "on," "under," or the like are only used to indicate relative position relationship, and when the position of the object which is described is changed, the relative position relationship may be changed accordingly.

The size of the accompanying drawings used in the present disclosure is not drawn according to actual scales. The number of pixel units is not limited to the number shown in the drawings. The specific size and number of structures may be determined according to actual requirement. The accompanying drawings in the present disclosure are only schematic views Electrochromism refers to the phenomenon that the optical properties (reflectivity, transmittance, absorptivity, and the like) of a material undergo a stable and reversible color change under the action of an applied electric field, and are represented as a reversible change in color and transparency in appearance. According to the theory of intervalence charge transfer model proposed by Faughnan et al., the principle of electrochromism is that an electrochromic material can undergo electrochemical oxidation-reduction reactions under the action of an applied electric field, and its optical properties, such as refractive index, reflectivity, or absorptivity, change, and are represented as a reversible change in color and transparency in appearance.

Simple description will be given below to the reflection enhancing principle of a reflection enhancing film. A single-layer or multi-layer reflection enhancing film may be formed by coating one or more layers of transparent dielectric films with a refractive index on a smooth surface. FIG. 1A is a schematic diagram of a single-layer reflection enhancing film. As shown in FIG. 1A, the thickness of a single thin film is h; the refractive index is n; and the refractive indexes of air and a substrate on the two sides of the film are respectively $n_0$ and $n_G$. When the refractive index n of the single thin film is greater than the refractive index $n_G$ of the substrate, the reflectivity of the film is greater than the reflectivity when the film is not coated, so the single film has reflection enhancing function. Especially when the optical thickness of the single film is $nh=\lambda_0/4$, the reflectivity of the film to $\lambda_0$ is the maximum. For example, for the optical thickness $nh=\lambda_0/4$, in this case, in addition to a portion $2nh=\lambda 0/2$ caused by the optical thickness of the single film, the optical path difference between two beams reflected by upper and lower surfaces of the single thin film also includes additional optical path difference $\lambda_0/2$ introduced by different phase changes when the beams are reflected by the two surfaces, so the two beams of reflected light will produce interference enhancement, resulting in maximum reflectivity. Simple description will be given below to the reflection enhancing principle of a multilayer film.

Figure 1B:
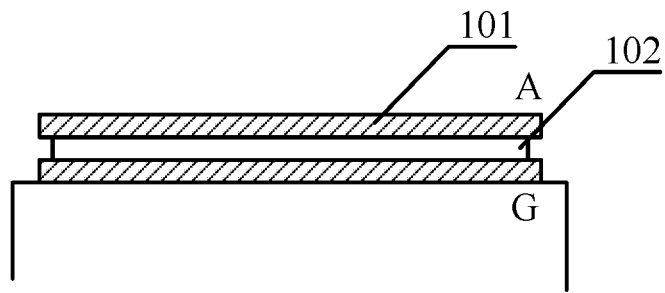
FIG. 1B is a schematic diagram of a multi-layer reflection enhancing layer.

FIG. 1B is a schematic diagram of a multi-layer reflection enhancing layer. According to the multi-beam interference principle, in the multilayer film, when the refractive indexes of dielectrics on the two sides of the film are greater or less than the refractive index of the film, respectively, if the phase difference between two successive beams in reflected beams of the film is equal to $\pi$ (the total optical path difference formed by the optical path difference $2nh=\lambda 0/2$ and the additional optical path difference is equal to $\lambda_0$), the reflected light at this wavelength gets the strongest reflection. The multilayer film as shown in FIG. 1B is formed by the alternate arrangement of a plurality of high refractive index films 101 and a plurality of low refractive index films 102. The refractive index of the high refractive index film 101 is $n_H$; the refractive index of the low refractive index film 102 is $n_L$; and $n_H > n_L$. Any high refractive index film 101 or low refractive index film 102 shall meet the requirement that the refractive indexes of the dielectrics on the two sides of the film are greater than or less than the refractive index of the film, respectively. When the thickness of each film is constant, the optical path difference 2nh between two successive beams undergoing reflection on this film can be changed by changing the refractive index n of the film, and then the reflectivity of the film to light at different wavelengths can be changed. When the total optical path difference between the two successive beams is $(2N+1)\lambda$ (N=0, 1, 2 . . . ), incident light with the wavelength $\lambda$ gets strong reflection on each film, and the incident light is almost completely reflected back after the reflection of multiple layers. For instance, when the thickness of each film is $\lambda/4$ and the total optical path difference between the two successive beams is $\lambda$, interference reinforcement will be produced. The incident light with the wavelength $\lambda$ will get strong reflection on each film. Moreover, when the difference between $n_H$ and $n_L$ is larger, the reflectivity of the multilayer film to the incident light with the wavelength $\lambda$ is higher.

Embodiments of the present disclosure provide a blue light-blocking structure, which comprises: a first transparent dielectric layer, a second transparent dielectric layer and an electro-refractive index adjusting layer. The second transparent dielectric layer is provided on a side of the first transparent dielectric layer; the electro-refractive index adjusting layer is provided between the first transparent dielectric layer and the second dielectric layer; and the electro-refractive index adjusting layer is configured to change the refractive index to blue light transmitted through the electro-refractive index adjusting layer under the action of an electrical field between a first side of the electro-refractive index adjusting layer near the first transparent dielectric layer and a second side near the second transparent dielectric layer.

The embodiment of the present disclosure provides a display device, which comprises the blue light-blocking structure.

The embodiment of the present disclosure provides a method for operating a display device, which comprises: providing a display device, in which the display device includes the blue light-blocking structure; and changing the refractive index of the electro-refractive index adjusting layer to blue light of different wavelengths by adjusting the voltage applied between the first side and the second side of the electro-refractive index adjusting layer, and turning on the blue light-blocking function or turning off the blue light-blocking function or adjusting the transmittance of blue light.

Description will be given below to the structure and the method involved in the present disclosure with reference to several preferred embodiments.

Figure 2A:
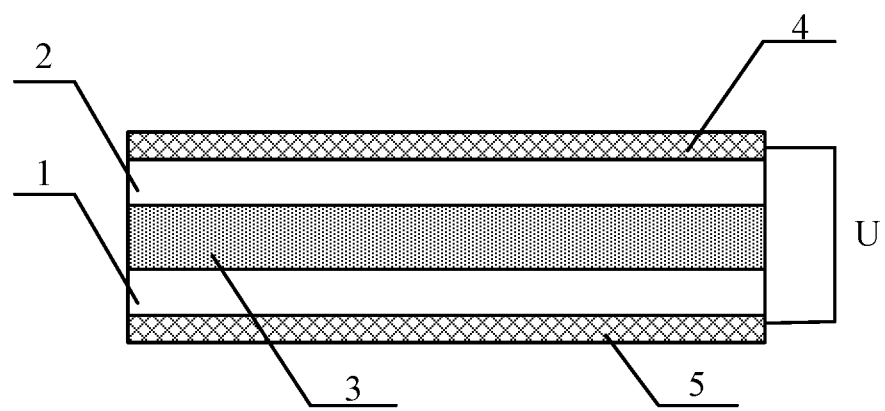
FIG. 2A is a schematically sectional view of a blue light-blocking structure provided by an embodiment of the present disclosure.
Figure 2B:
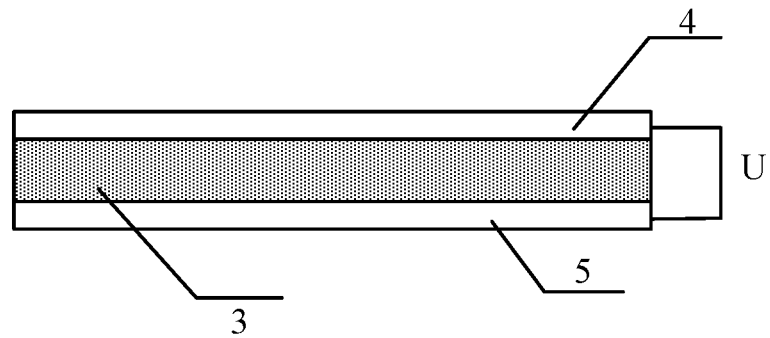
FIG. 2B is a schematic diagram of another blue light-blocking structure provided by an embodiment of the present disclosure.
Figure 3A:
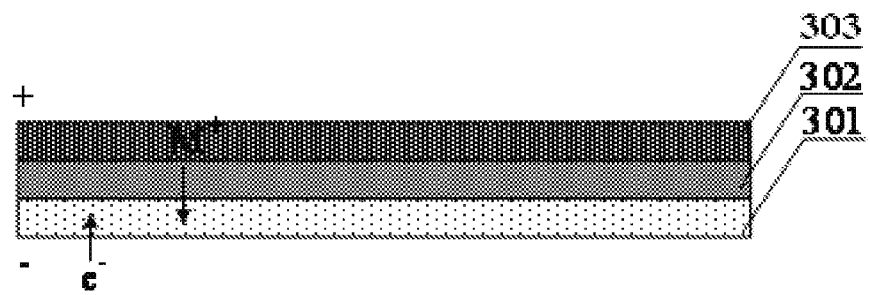
FIGS. 3A-3B are schematic diagrams illustrating the structure and the working principle of an electro-refractive index adjusting layer of the blue light-blocking structure as shown in FIG. 2A.
Figure 3B:
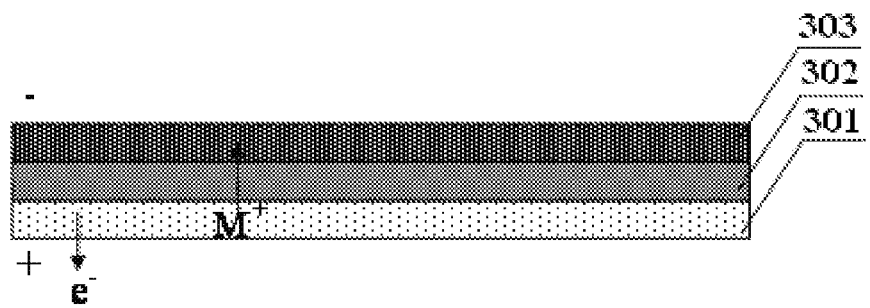

FIG. 2A is a schematically sectional view of a blue light-blocking structure provided by an embodiment of the present disclosure. FIG. 2B is a schematically sectional view of another blue light-blocking structure provided by an embodiment of the present disclosure. FIGS. 3A-3B are schematic diagrams illustrating the structure and the working principle of an electro-refractive index adjusting layer of the blue light-blocking structure as shown in FIG. 2A.

The embodiments provide a blue light-blocking structure, which comprises: a first transparent dielectric layer, a second transparent dielectric layer and an electro-refractive index adjusting layer. The second transparent dielectric layer is disposed on a side of the first transparent dielectric layer. The electro-refractive index adjusting layer is disposed between the first transparent dielectric layer and the second transparent dielectric layer. The electro-refractive index adjusting layer is configured to change the refractive index to blue light transmitted through the electro-refractive index adjusting layer under the action of an electrical field applied between a first side of the electro-refractive index adjusting layer near the first transparent dielectric layer and a second side of the electro-refractive index adjusting layer near the second transparent dielectric layer. The blue light-blocking structure provided by the embodiments can prevent blue light at different wavelengths, and allow the user to selectively turn on or turn off the blue light-blocking function, or adjust the transmittance of blue light according to personal demands.

Exemplarily, as shown in FIG. 2A, a blue light-blocking structure 10 comprises a first transparent dielectric layer 1, a second transparent dielectric layer 2 and an electro-refractive index adjusting layer 3. The electro-refractive index adjusting layer 3 is disposed on a side of the first transparent dielectric layer 1, and the second transparent dielectric layer 2 is layered to a side of the electro-refractive index adjusting layer 3, namely the electro-refractive index adjusting layer 3 is disposed between the first transparent dielectric layer 1 and the second transparent dielectric layer 2. When an electrical field is applied between a first side of the electro-refractive index adjusting layer 3 near the first transparent dielectric layer 1 and a second side near the second transparent dielectric layer 2, the refractive index of the electro-refractive index adjusting layer 3 to blue light transmitted through the electro-refractive index adjusting layer can be adjusted to be higher than or lower than the refractive indexes of the first transparent dielectric layer 1 and the second transparent dielectric layer 2 to the blue light. In this way, a reflection enhancing film system, in which layers of high and low refractive indexes alternately superimposed to each other, may be formed. On the basis of designing a thickness of the first transparent dielectric layer 1, the second transparent dielectric layer 2 and the electro-refractive index adjusting layer 3, the optical path difference of the blue light in beams incident into the blue light-blocking structure from each film/layer can be changed by changing the refractive index of the electro-refractive index adjusting layer 2, so as to obtain different blue light interference intensity and then obtain different reflectivity to the blue light. In this way, the transmittance of the blue light-blocking structure to the blue light can be adjusted, namely the blue light-blocking degree is adjustable.

For instance, as shown in FIG. 2A, the blue light-blocking structure 10 may also comprise a first electrode 5 disposed under the first transparent dielectric layer 1 (namely the side of the first transparent dielectric layer 1 away from the electro-refractive index adjusting layer 3) and a second electrode 4 disposed on the second transparent dielectric layer 2 (namely the side of the second transparent dielectric layer 2 away from the electro-refractive index adjusting layer 3). The first electrode 5 and the second electrode 4 are configured to apply an electrical field to the electro-refractive index adjusting layer 3, namely applying an electrical field from the first electrode 5 to the second electrode 4 or a reverse electrical field. For instance, a high potential is applied to the first electrode 5 and a low potential is applied to the second electrode 4 by a power, so as to form a voltage U between the first electrode 5 and the second electrode 4, and the voltage U can be adjusted. In this way, an electrical field with variable field intensity is formed between the first side of the electro-refractive index adjusting layer 3 near the first transparent dielectric layer 1 and the second side near the second transparent dielectric layer 2, so that the refractive index of the electro-refractive index adjusting layer 3 to the blue light can be changed and may be adjusted as required. For instance, the refractive index of the electro-refractive index adjusting layer 3 to the blue light can be increased with the increasement of the voltage within a given range. The refractive index of the electro-refractive index adjusting layer 3 to the blue light is controlled by controlling the voltage, so as to change the difference between the refractive index of the electro-refractive index adjusting layer 3 to the blue light and the respective refractive index of the first transparent dielectric layer 1 and the second transparent dielectric layer 2, and control the refractive index of the reflection enhancing film system to the blue light.

For instance, the materials of the first electrode 5 and the second electrode 4 are transparent conductive materials, which can avoid the impact on the light extracting rate of the display device employing the blue light-blocking structure. For instance, the transparent conductive material may be indium tin oxide (ITO), indium zinc oxide (IZO), aluminum-doped zinc oxide (AZO), fluorine-doped tin oxide (FTO), etc. The materials of the first electrode 5 and the second electrode 4 are not limited to the above materials or categories.

For instance, in another example of the embodiment, as shown in FIG. 2B, the first transparent dielectric layer may be multiplexed as the first electrode 5, and the second transparent dielectric layer may be multiplexed as the second electrode 4. In this case, the materials of the first electrode 5 and the second electrode 4, for instance, may be the foregoing transparent conductive materials. The structure can simplify the blue light-blocking structure, and on one hand, the thickness of the blue light-blocking structure can be reduced, so that the blue light-blocking structure can be more applicable to thin products, such as thin display devices; in addition, the production cost of the blue light-blocking structure can be reduced. The working principle of the blue light-blocking structure as shown in FIG. 2B is the same as that as shown in FIG. 2A and may refer to the above description. For instance, the materials of the electro-refractive index adjusting layer may be inorganic electrochromic materials, such as phosphotungstic acid; and the materials of the electro-refractive index adjusting layer may also be organic electrochromic materials, such as pyrazoline, or viologen. The materials of the electro-refractive index adjusting layer are not limited to the types or the materials listed above.

For instance, as shown in FIGS. 3A and 3B, in an example, the electro-refractive index adjusting layer 3 may include an electrochromic layer 301, an ion conductive layer 302 and an ion storage layer 303. The ion storage layer 303 is configured to store ions required by the electrochromic layer for discoloration or changing color. The ion conductive layer 302 is configured to conduct the ions in the ion storage layer 303 between the electrochromic layer 301 and the ion storage layer 303. According to the theory of intervalence charge transfer model, under the action of an applied electrical field, the ions in the ion storage layer 303 are injected into the electrochromic layer 301 or extracted from the electrochromic layer 301 through the ion conductive layer 302, and meanwhile, electrons are also injected into the electrochromic layer 301 or extracted from the electrochromic layer 301, so the optical properties, such as the refractive index, the reflectivity or the absorptivity of the electrochromic layer 301, can be changed and represented as a reversible change in color and transparency in appearance. In this way, the overall refractive index of the electro-refractive index adjusting layer including the electrochromic layer 301, the ion conductive layer 302 and the ion storage layer 303, can undergo a reversible change. For instance, when the material of the electrochromic layer 301 is tungsten trioxide ($WO_3$), it is generally considered that the reaction equation is as follows:

$$xM^+ + xe^- + WO_3 \rightarrow M_xWO_3 \qquad (1)$$

where $M^+$ may represent $H^+$, $Li^+$ or the like, namely the ions stored in the ion storage layer 303 may include $H^+$, $Li^+$, etc.

When an electrical field in the direction as shown in FIG. 3A is applied, electrons $e^-$ and cations $M^+$ are simultaneously injected into defect locations between $WO_3$ atomic lattices of the electrochromic layer 301 to form tungsten bronze ($M_xWO_3$), blue color is shown. The refractive index of the electrochromic layer 301 to the blue light is increased with the increasement of the voltage within a given voltage range. When the electrical field in the direction as shown in FIG. 3A is applied, the electrons $e^-$ and the cations $M^+$ in the electrochromic layer 301 are simultaneously extracted, and the blue color disappears, so the optical properties of the electrochromic layer 301 can realize reversible recovery. In this way, the reversible change of the refractive index of the electrochromic layer 301 is controlled by controlling the direction and the magnitude of the voltage according to the above principle, and the reversible change of the refractive index of the electro-refractive index adjusting layer 3 can be controlled. Under a voltage, if the voltage at the two sides of the electro-refractive index adjusting layer 3 is cut off so that the oxidation-reduction reaction does not occur again, the electro-refractive index adjusting layer 3 can maintain the optical properties under the voltage condition, namely it has memory function.

For instance, the materials of the electrochromic layer 301 may include inorganic electrochromic materials or organic electrochromic materials. The inorganic electrochromic material, for instance, may be tungsten trioxide ($WO_3$), titanium dioxide ($TiO_2$), molybdenum trioxide ($MoO_3$), vanadium pentoxide ($V_2O_5$), nickel oxide (NiO), etc. The organic electrochromic materials may include organic small molecular electrochromic materials, such as viologen type compounds, tetrathiafulvalene type compounds or metal phthalocyanine type compounds, or may be conductive polymer electrochromic materials, such as polythiophenes and derivatives thereof or conductive polyacetylene.

The ion storage layer 303 has the functions of storing the ions required by the electrochromic layer for discoloration and balancing charges in the coloring process, and for instance, it may be a mixed conductor of electrons and ions. For instance, a complementary electrochromic material or a weakly electrochromic or transparent non-electrochromic electron and ion mixed conductor may be adopted and can remain transparent or weakly colored upon the injection of complementary electrons or electrons or ions of the electrochromic layer. For instance, the mixed conductor may include one or more selected from the group consisting of tungsten oxide ($WO_3$), nickel oxide (NiO), cerium oxide ($CeO_2$), titanium oxide ($TiO_2$), molybdenum oxide ($MoO_3$) and vanadium oxide ($V_2O_5$). For instance, the ion storage layer 303 may be determined according to the materials of the electrochromic layer.

For instance, the ion conductive layer 302 can provide compensation ions required by the electrochromic materials and may have high ionic conductance. For instance, the ionic conductance $\geq 1 \times 10^{-7}$ $\Omega \cdot cm^{-1}$. For instance, these ion conductive materials may include transparent conductive oxides (TCO), such as tin oxide or zinc oxide, AZO, ITO or FTO.

It should be noted that the material(s) of the electrochromic layer 301, the material(s) of the ion storage layer 303 and the material(s) of the ion conductive layer 302 are not limited to the types listed above.

Description will be given below to the working principle of the blue light-blocking structure. It should be noted that, when the reflection enhancing film system includes the electro-refractive index adjusting layer 3, the first transparent dielectric layer 1 and the second transparent dielectric layer 2, one of the three layers can be considered as a layer as described below.

For instance, in an example of the embodiment, when no electrical field is applied, the refractive indexes of the electro-refractive index adjusting layer 3, the first transparent dielectric layer 1 and the second transparent dielectric layer 2 to the blue light may be substantially equal; and when the electrical field is applied, the refractive index of the electro-refractive index adjusting layer 3 to the blue light can be increased with the increasement of the electrical field intensity. In this way, when no electrical field is applied to the electro-refractive index adjusting layer 3, the refractive indexes of the electro-refractive index adjusting layer 3, the first transparent dielectric layer 1 and the second transparent dielectric layer 2 are substantially consistent, and the film system including the electro-refractive index adjusting layer 3, the first transparent dielectric layer 1 and the second transparent dielectric layer 2 does not have reflection enhancing function, which is equivalent to that the blue light-blocking function is not turned on. When an electrical field is applied to the electro-refractive index adjusting layer 3, the refractive index of the electro-refractive index adjusting layer 3 to the blue light is increased with the increasement of the electrical field intensity and will be greater than the refractive indexes of the first transparent dielectric layer 1 and the second transparent dielectric layer 2 on the two sides of the electro-refractive index adjusting layer, which is equivalent to that the refractive indexes of the dielectrics on the two sides of the layer are less than the refractive index of the layer. At this point, the film system includes the electro-refractive index adjusting layer 3, the first transparent dielectric layer 1 and the second transparent dielectric layer 2 form the reflection enhancing film system.

According to the reflection enhancing principle of the multilayer reflection enhancing film system, appropriate thickness of the layers may be designed by one of ordinary skill in the art according to the refractive indexes of the electro-refractive index adjusting layer 3, the first transparent dielectric layer 1 and the second transparent dielectric layer 2 and the following formula (2):

$$nh=(2N+1)\lambda_0/4 (N=0,1,2 \ldots )(410 \text{ nm} \leq \lambda_0 \leq 470 \text{ nm}) \quad (2),$$

In this way, the refractive index of the electro-refractive index adjusting layer 3 may be changed by changing the voltage, the optical path difference between the two successive beams may be changed, and the reflectivity of the layer to the blue light may be changed. In the above formula (2), n refers to the refractive index of each layer; h refers to the thickness of each layer; and $\lambda_0$ refers to the wavelength of the blue light.

For instance, when the total optical path difference between the two successive beams of a layer is $(2N+1)\lambda_0$ (N=0, 1, 2 . . . ), the blue light at the wavelength $\lambda_0$ gets strong reflection on this layer, and at this point, the blue light-blocking effect is the strongest. For instance, each of the thickness of the electro-refractive index adjusting layer 3, the first transparent dielectric layer 1 and the second transparent dielectric layer 2 may be $\lambda_0/4$, and at this point, the total optical path difference between the two successive beams is $\lambda_0$, so interference enhancement can be produced and the reflectivity can be very high. Moreover, the higher the applied voltage is, the larger the difference between the refractive index of the electro-refractive index adjusting layer 3 and the respective refractive index of the first transparent dielectric layer 1 and the second transparent dielectric layer 2 is, the higher the reflectivity to the blue light is, the lower the transmittance of blue light is, and the stronger the blue light-blocking degree is. In this way, the transmittance of the blue light can be adjusted. According to the working principle of the electro-refractive index adjusting layer 3, when a reverse voltage is applied, the reversible recovery of the optical properties of the electro-refractive index adjusting layer 3 can be realized, and then the blue light-blocking effect is turned off. As the electrochromic layer 303 has memory property, under a voltage, if the voltage applied to the two sides of the electro-refractive index adjusting layer 3 is cut off so that the reduction-oxidization reaction does not occur, the blue light-blocking state at that time can be maintained.

For instance, in the example, the electrochromic layer 301 of the electro-refractive index adjusting layer 3 may include tungsten trioxide ($WO_3$), titanium dioxide ($TiO_2$) or the like, and the refractive index of the electro-refractive index adjusting layer can be increased with the increasement of the applied voltage within a given range. Transparent materials of which the refractive index is substantially equal to the refractive index of the selected material of the electro-refractive index adjusting layer 3 may be selected by one of ordinary skill in the art to form the first transparent dielectric layer 1 and the second transparent dielectric layer 2. For instance, the material of the first transparent dielectric layer 1 and that of the second transparent dielectric layer 2 may be the same, and the refractive indexes of them can be equal to each other. The above material types are only examples. The embodiment of the present disclosure is not limited thereto.

It should be noted that: as the refractive index of the electro-refractive index adjusting layer is adjustable, as known from the formula nh=(2N+1)$\lambda_0$/4 (N=0, 1, 2 . . . ), the blue light-blocking structure provided by the embodiment may allow the blue light at different wavelengths to have different optical path differences, so the blue light-blocking structure provided by the embodiment can adjustably prevent the blue light at different wavelengths (e.g., the blue light with the wavelength of about 410 nm-470 nm) and can be applied to different scenes, e.g., different display devices, which need not to change the blue light-blocking structure, but the operation voltage applied thereto. In this way, the production cost can be reduced.

For instance, the materials of the first transparent dielectric layer 1 and the second transparent dielectric layer 2 may include resin materials or photoresist materials. The photoresist materials, for instance, may be photoresist, or resin materials added with photoresist materials, etc. The resin materials may be various typess of resins with different refractive indexes, for instance, they may be resin materials with high refractive indexes, such as polystyrene (PS), polycarbonate (PC) or epoxy resins obtained by introduction of sulfur, halogen or other high refractive index atoms, and may also be resin materials with low refractive indexes, such as polymethyl methacrylate (PMMA) or polyallyl diglycol carbonate (PADC). One of ordinary in the art may select the material to form the first transparent dielectric layer 1 and the second transparent dielectric layer 2 according to the variation range of the refractive index of the electro-refractive index adjusting layer 3 under the condition of no electrical field applied or the condition of an electrical field applied thereto.

For instance, in another example of the embodiment, when no electrical field is applied, the refractive index of the electro-refractive index adjusting layer 3 to the blue light may be less than the respective refractive index of the first transparent dielectric layer 1 and the second transparent dielectric layer 2 to the blue light; and when the electrical field is applied, the refractive index of the electro-refractive index adjusting layer 3 to the blue light may be increased with the increasement of the electrical field intensity. For instance, the refractive index of the electro-refractive index adjusting layer 3 to the blue light may be equal to or greater than the respective refractive index of the first transparent dielectric layer 1 and the second transparent dielectric layer 2 to the blue light. In this way, when the electrical field is not applied to the electro-refractive index adjusting layer 3, the refractive index of the electro-refractive index adjusting layer 3 to the blue light is less than the respective refractive index of the layers on the two sides thereof, which is equivalent to the case that the refractive indexes of the dielectrics on the two sides of the layer are both greater than the refractive index of the layer, and at this point, the film system including the electro-refractive index adjusting layer 3, the first transparent dielectric layer 1 and the second transparent dielectric layer 2 forms the reflection enhancing film system. When the electrical field is applied to the electro-refractive index adjusting layer 3, with the increasement of the voltage, the refractive index of the electro-refractive index adjusting layer 3 to the blue light is increased, and when the refractive index is increased to be substantially equal to the refractive index of the first transparent dielectric layer 1 and the refractive index of the second transparent dielectric layer 2, the film system does not have reflection enhancing function, which is equivalent to turn off the blue light-blocking function; and when the refractive index of the electro-refractive index adjusting layer 3 to the blue light is increased to be greater than the refractive index of the first transparent dielectric layer 1 and the refractive index of the second transparent dielectric layer 2, it is equivalent to the case that the refractive indexes of the dielectrics on the two sides of the layer are less than the refractive index of the layer, respectively, and at this point, the electro-refractive index adjusting layer 3, the first transparent dielectric layer 1 and the second transparent dielectric layer 2 form the reflection enhancing film system. In this way, the blue light-blocking structure provided by the embodiment can also turn on and turn off the blue light-blocking function, and adjust the transmittance of the blue light.

The control principle of the transmittance of the blue light and the materials of the electro-refractive index adjusting layer 3, the first transparent dielectric layer 1 and the second transparent dielectric layer 2 may refer to the description in the above example. The types of the materials may be determined by one of ordinary in the art according to the required refractive index, for example.

Figure 4A:
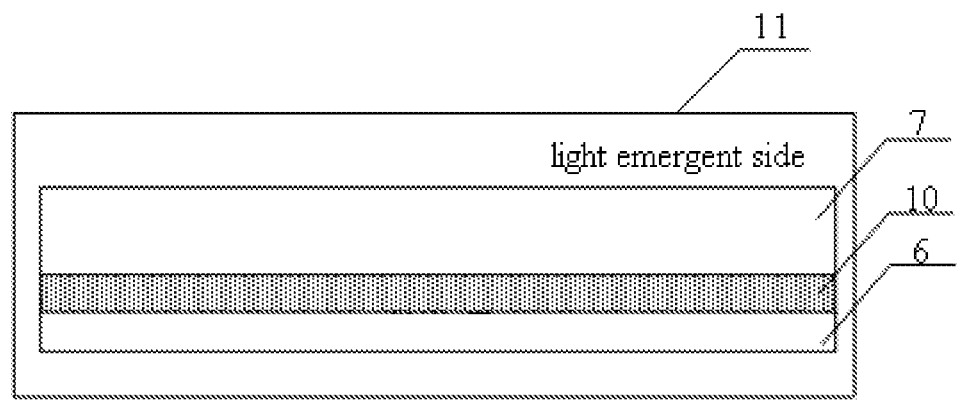
FIG. 4A is a schematic diagram of a display device with a backlight, provided by an embodiment of the present disclosure.
Figure 4B:
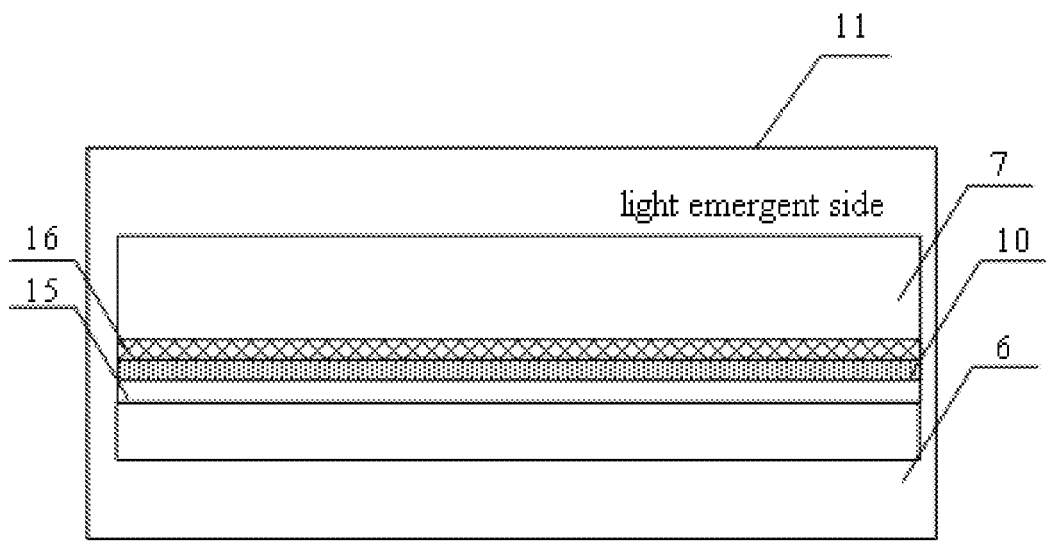
FIG. 4B is a schematic diagram of another display device with a backlight, provided by an embodiment of the present disclosure.
Figure 4C:
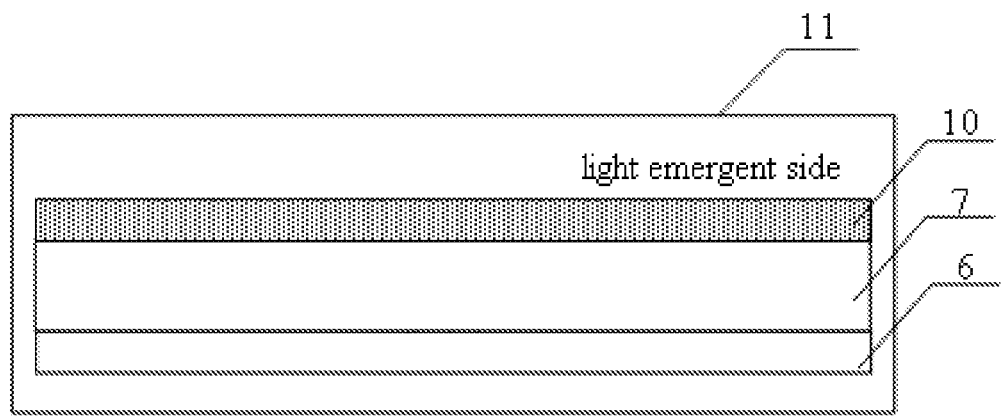
FIG. 4C is a schematic diagram of yet another display device with a backlight, provided by an embodiment of the present disclosure.
Figure 4D:
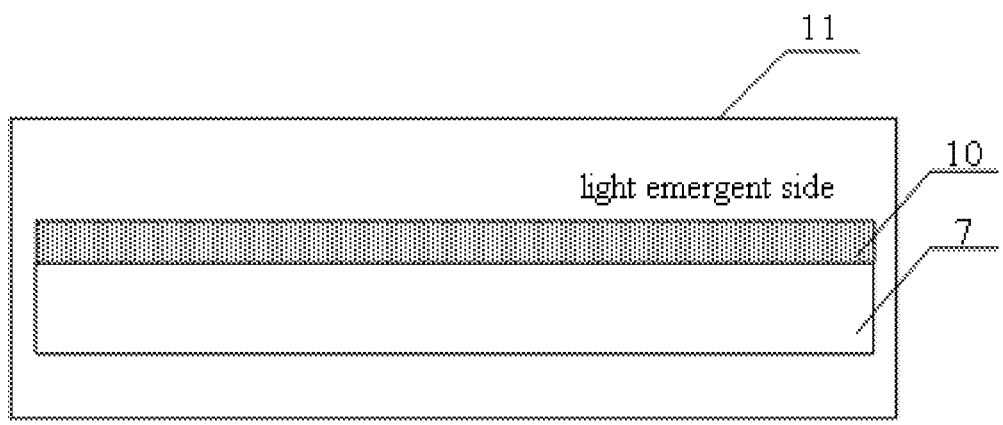
FIG. 4D is a schematic diagram of a display device not requiring a backlight, provided by an embodiment of the present disclosure.

FIG. 4A is a schematic diagram of a display device requiring a backlight provided by an embodiment of the present disclosure. FIG. 4B is a schematic diagram of another display device requiring a backlight provided by an embodiment of the present disclosure. FIG. 4C is a schematic diagram of yet another display device requiring a backlight provided by an embodiment of the present disclosure. FIG. 4D is a schematic diagram of a display device not requiring a backlight provided by an embodiment of the present disclosure.

The embodiments provide a display device, which comprises any of the blue light-blocking structures. The display device, for instance, may be any device with display function, such as a mobile phone, a tablet PC, a display, a TV, a camera with a display, or an ATM, or may be a touch display device. The display device can prevent blue light of different wavelengths and have the effect of allowing the user to selectively turn on or turn off the blue light-blocking function, or adjust the blue light-blocking degree according to personal demands.

For instance, as shown in FIG. 4A, a display device 11 comprises a display panel 7 and a backlight 6 disposed on a light incident side of the display panel 7. The blue light-blocking structure 10 is disposed between the backlight 6 and the display panel 7. The backlight 6, for instance, may be an electroluminescent (EL), cold cathode fluorescent lamp (CCFL) or light-emitting diode (LED) backlight, and may be set to be direct-lit or side-lit type. Light from the backlight 6 is incident into the blue light-blocking structure 10 at first, runs through the blue light-blocking structure 10, and is then incident into the display panel. The display device 11 has the function of controlling the 'on,' 'off' of the blue light-blocking function, or the blue light-blocking degree. It should be noted that the embodiment mainly shows structural examples directly relevant to the blue light-blocking structure 10, and other structures may be designed by one of ordinary in the art with reference to the common techniques. In addition, the type, the arrangement mode and the like of the backlight in the embodiment may be any mode capable of realizing the function.

For instance, as shown in FIG. 4B, in the display device 11 with the backlight 6, the display device 11 may also comprise a display panel, and the blue light-blocking structure 10 is disposed in the display panel. For instance, the display panel includes an array substrate and may also comprise an opposed substrate (e.g., a color filter (CF) substrate or a package substrate) arranged oppositely to the array substrate. For instance, the array substrate includes a base substrate 15 and a display driver circuit layer 16, and the blue light-blocking structure 10, for instance, may be disposed between the base substrate 15 and the display driver circuit layer 16. In this way, the blue light-blocking structure 10 can be closer to the display driver circuit layer 16, so as to connect the electrode(s) of the electro-refractive index adjusting layer of the blue light-blocking structure 10 to the control circuit and simplify the structure. For instance, the display driver circuit layer 16 includes a thin-film transistor (TFT) switching structure, gate lines, data lines (not shown in FIG. 4B), etc. Other structures and effects of the display device 11 are the same as those described in the example as shown in FIG. 4A. No further description will be repeated here.

Figure 4E:
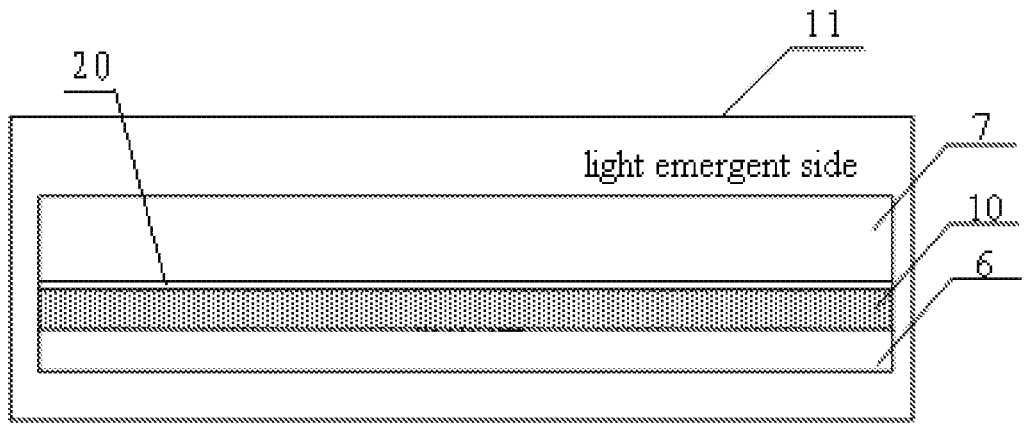
FIG. 4E is a schematic diagram of the display device with the backlight provided by the embodiment of the present disclosure as shown in FIG. 4A, in which an insulating layer is formed.
Figure 4F:
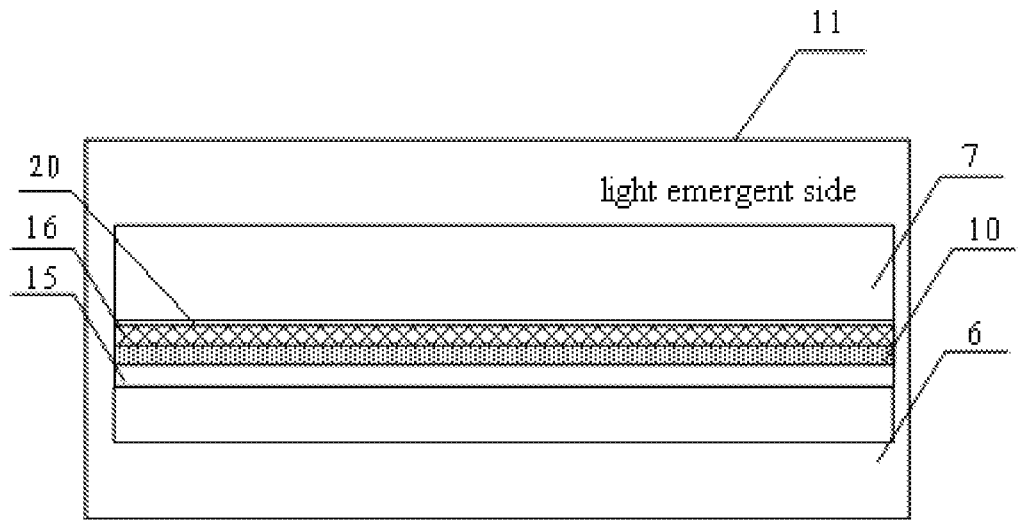
FIG. 4F is a schematic diagram of the display device with the backlight provided by the embodiment of the present disclosure as shown in FIG. 4B, in which an insulating layer is formed.

For instance, when the display device 11 as shown in FIG. 4A or 4B is an LCD device, the display device 11 may also comprise an insulating layer 20, as shown in FIG. 4E. For instance, the insulating layer 20 may be disposed between the blue light-blocking structure 10 as shown in FIG. 4A and the display panel 7; or for instance, the insulating layer 20 may be disposed between the blue light-blocking structure 10 as shown in FIG. 4B and the display driver circuit layer 16, as shown in FIG. 4F. For instance, the thickness of the insulating layer may be about 1,000 nm. The insulating layer can isolate the electrical field applied to the blue light-blocking structure 10 and reduce the impact on the deflection of liquid crystals.

For instance, the blue light-blocking structure 10 may also be disposed on a light emergent side of the display panel 7. Exemplarily, as shown in FIG. 4C, in the display device 11 comprising the backlight 6, as different from the display device comprising the backlight 6 as shown in FIGS. 4A and 4B, the backlight 6 of the display panel 7 is disposed on the display panel 7, and the blue light-blocking structure 10 may be disposed on the light emergent side of the display panel 7. Light from the backlight 6 is incident into the display panel 7 at first, is emitted from the display panel 7, and then runs through the blue light-blocking structure 10. The example can also achieve the effect(s) which is/are the same as or similar to that of the examples as shown in FIGS. 4A and 4B.

For instance, as shown in FIG. 4D, in the display device 11 not requiring the backlight, for example, the display device 11 may be an organic light-emitting diode (OLED) display device, an EL display device (e.g., an OLED display device) or the like, and the blue light-blocking structure 10 may also be disposed on the light emergent side of the display panel 7. In this way, the example can also achieve the effects of preventing blue light of various wavelengths and allowing the user to selectively turn on or turn off the blue light-blocking function, or adjust the blue light-blocking degree.

For instance, the display device 11 provided by the above example may also comprise a control circuit which is configured to control the intensity of the electrical field applied to the electro-refractive index adjusting layer of the blue light-blocking structure 10. For instance, the control circuit may be disposed on a printed circuit board (PCB), or for instance, disposed in a same chip as a display control circuit. The control circuit is configured to control the voltage applied to the electro-refractive index adjusting layer, so as to control the 'on,' 'off' of the blue light-blocking function, and the blue light-blocking degree. Button(s) for the user to operate may be disposed on the display device, so that the user of the display device 11 can adjust the blue light-blocking degree as required. The arrangement mode of the buttons may be designed by one of ordinary in the art according to the related techniques in the art.

Figure 5:
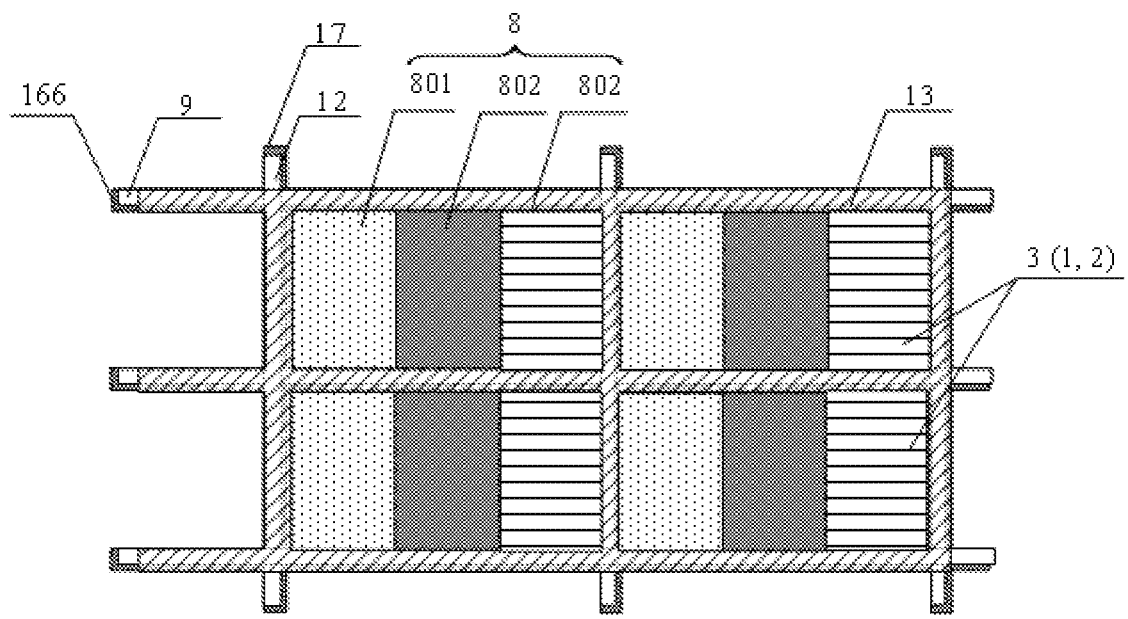
FIG. 5 is a schematic plan view of a display panel of another display device provided by an embodiment of the present disclosure.

For instance, as shown in FIG. 5, the display panel 7 may comprise a plurality of pixel units 8, and each pixel unit 8 includes a red subpixel 801, a green subpixel 802 and a blue subpixel 803, for example. The electro-refractive index adjusting layer 3 is overlapped with the blue subpixels, and correspondingly, the first transparent dielectric layer 1 and the second transparent dielectric layer 2 are also overlapped with the blue subpixels. At this point, a plurality of first electrodes and second electrodes may be arranged so as to apply a voltage to a plurality of parts of the electro-refractive index adjusting layer 3 overlapped with the blue subpixels, respectively. For instance, in another example, the electro-refractive index adjusting layer may be overlapped with all of the plurality of pixel units, and correspondingly, the first transparent dielectric layer and the second transparent dielectric layer are overlapped with all of the plurality of pixel units, that is, the electro-refractive index adjusting layer, the first transparent dielectric layer and the second transparent dielectric layer may cover all of the plurality of pixel units. At this point, the first electrode and the second electrode of the blue light-blocking structure may be respectively arranged, and this structure is relatively simple.

For instance, the blue light-blocking structure 10 may be connected with the control circuit through a lead, and the lead is arranged corresponding to a non-display area. The lead includes a first electrode leading wire 166 for connecting the first electrode of the blue light-blocking structure 10 to the control circuit and a second electrode leading wire 17 for connecting the second electrode of the blue light-blocking structure 10 to the control circuit. As shown in FIG. 5, a non-display area 13 may be arranged around each pixel unit 8. For instance, the non-display area 13 may correspond to a black matrix (BM) of an LCD device or correspond to a pixel define layer (PDL) of an OLED display device. For instance, gate lines 12 and data lines 9 are disposed at positions of the array substrate corresponding to the non-display areas 13. For instance, at least one part of each first electrode leading wire 166 may be overlapped with a data line 9, and at least one part of each second electrode leading wire 17 may be overlapped with a gate line 12. In this way, both the first electrode leading wires 166 and the second electrode leading wires 17 can be disposed in the non-display area, so as to avoid the impact on the aperture ratio of the display device.

An embodiment of the present disclosure also provides a method for manufacturing a blue light-blocking structure. For instance, the method comprises: forming a first transparent dielectric layer; forming an electro-refractive index adjusting layer on a side of the first transparent dielectric layer; forming a second transparent dielectric layer on a side of the electro-refractive index adjusting layer; and configuring the electro-refractive index adjusting layer to be able to adjust the refractive index of the electro-refractive index adjusting layer to the blue light transmitted through the electro-refractive index adjusting layer when an electrical field is applied between a first side of the electro-refractive index adjusting layer near the first transparent dielectric layer and a second side near the second transparent dielectric layer, and allowing the refractive index of the electro-refractive index adjusting layer to the blue light transmitted through the electro-refractive index adjusting layer to be converted to be higher than or lower than the respective refractive index of the first transparent dielectric layer and the second transparent dielectric layer to the blue light.

Exemplarily, FIGS. 6A-6E are schematic diagrams of the method for manufacturing the blue light-blocking structure, provided by an embodiment of the present disclosure. The blue light-blocking structure can be formed on a surface of a desired structure as needed. For instance, description will be given below by taking the case that the blue light-blocking structure is disposed on a base substrate as an example.

Figure 6A:
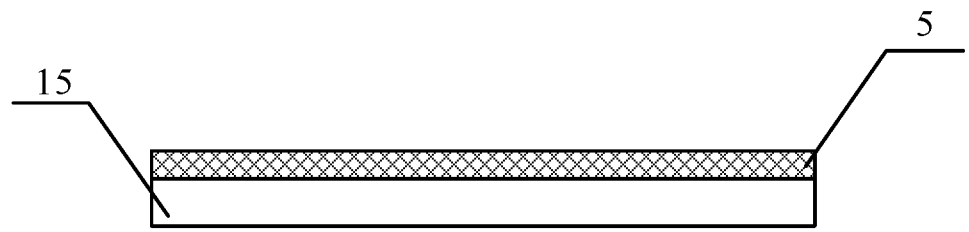
FIGS. 6A-6E are schematic diagrams of structures formed by a method for manufacturing a blue light-blocking structure, provided by an embodiment of the present disclosure.

As shown in FIG. 6A, a base substrate 15 is provided, and a first electrode 5 is formed on the base substrate 15. The material of the first electrode 5 may refer to the description in the embodiment about the blue light-blocking structure. For instance, the first electrode may be formed by a chemical vapor deposition (CVD) process, and the thickness of the first electrode may be designed as required. For instance, the thickness may be about 50 nm-100 nm.

Figure 6B:
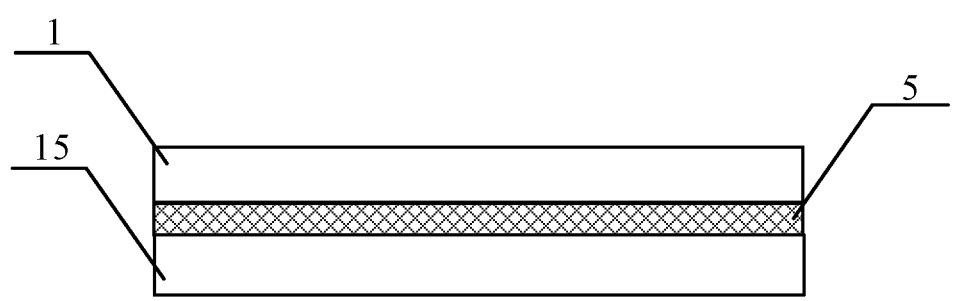

As shown in FIG. 6B, a first transparent dielectric layer 1 is formed on a side of the first electrode 5 by a coating process, such as fine blade coating, or a deposition process, such as CVD. The material of the first transparent dielectric layer 1 may refer to the description in the embodiment about the blue light-blocking structure.

Figure 6C:
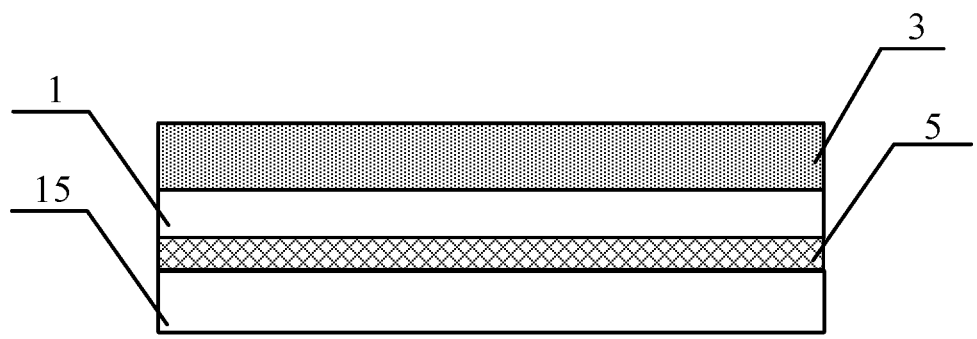

As shown in FIG. 6C, the electro-refractive index adjusting layer 3 is formed on the first transparent dielectric layer 1. The electro-refractive index adjusting layer 3 is superimposed to the first transparent dielectric layer 1. For instance, the electro-refractive index adjusting layer 3 may cover the entire first transparent dielectric layer 1. The material of the electrochromic layer of the electro-refractive index adjusting layer 3 may refer to the description in the embodiment about the blue light-blocking structure. The forming of the electro-refractive index adjusting layer 3 includes: forming the electrochromic layer, forming an ion conductive layer and forming an ion storage layer. When the material of the electrochromic layer is the above inorganic electrochromic material, the electrochromic layer may be formed by a process, such as an evaporation process, a magnetron sputtering process, a sol-gel process, a CVD process, an anodization process, an electrodeposition process, a pulsed excimer laser deposition process, or an ion plating process. The ion conductive layer and the ion storage layer of the electro-refractive index adjusting layer 3, for instance, may be formed by a process, such as a magnetron sputtering process, or a CVD process.

Figure 6D:
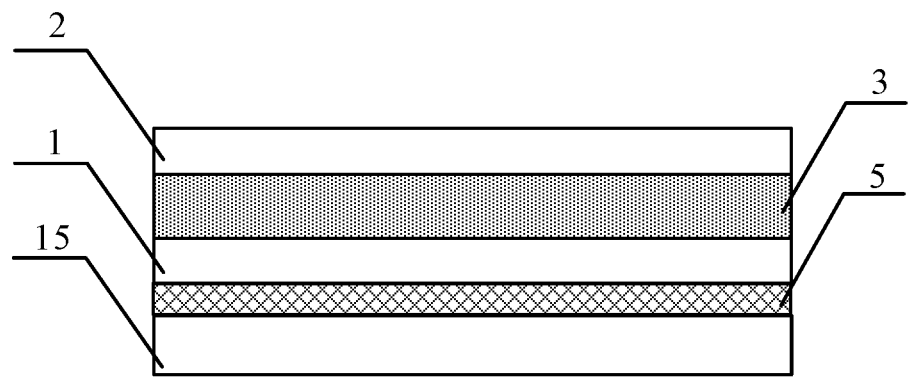

As shown in FIG. 6D, a second transparent dielectric layer 2 is formed on a side of the electro-refractive index adjusting layer 3. The second transparent dielectric layer 2 is layered on the electro-refractive index adjusting layer 3. For instance, the second transparent dielectric layer 2 may cover the entire electro-refractive index adjusting layer 3. The material of the second transparent dielectric layer 2 may be the same as the material of the first transparent dielectric layer 1 and refers to the above description. The process for forming the second transparent dielectric layer 2 may refer to the process for forming the first transparent dielectric layer 1.

It should be noted that appropriate thickness of the layers may be designed by one of ordinary in the art according to the refractive indexes of the electro-refractive index adjusting layer 3, the first transparent dielectric layer 1 and the second transparent dielectric layer 2 and the formula $nh=(2N+1)\lambda_0/4$ ($N=0, 1, 2 \ldots$) (410 nm$\leq\lambda_0\leq$470 nm), so as to change the refractive index of the electro-refractive index adjusting layer 3 by changing the voltage, change the optical path difference between the two successive beams, and change the reflectivity of the electro-refractive index adjusting layer 3 to the blue light. In the above formula, n refers to the refractive index of each layer; h refers to the thickness of each layer; and $\lambda_0$ refers to the wavelength of the blue light. For instance, the thickness of the first transparent dielectric layer 1 and the second transparent dielectric layer 2 may be about 100 nm-600 nm, however, the embodiment of the present disclosure is not limited thereto.

Figure 6E:
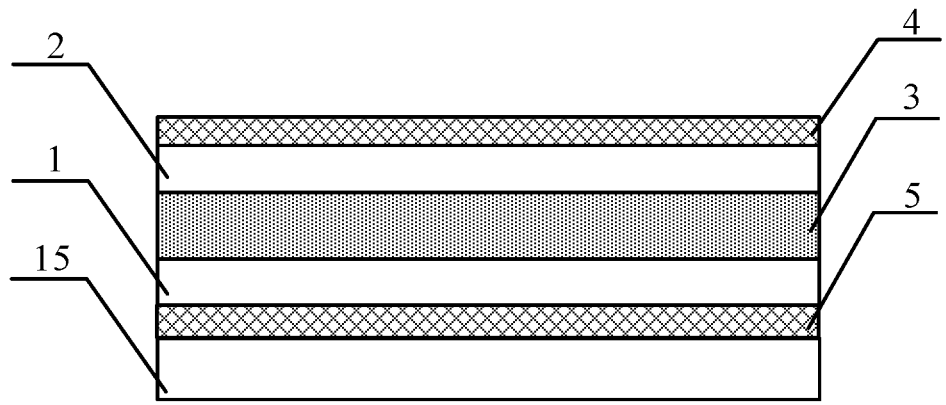

As shown in FIG. 6E, a second electrode 4 is formed above the second transparent dielectric layer 2. The method for forming the second electrode 4 may refer to the forming of the first electrode 5. The first electrode 5 and the second electrode 4 are connected with the control circuit, for instance, may be connected with each other through leads, so as to apply a voltage between the first electrode 5 and the second electrode 4. In this way, an electrical field can be applied between a first side of the electro-refractive index adjusting layer 3 near the first transparent dielectric layer 1 and a second side near the second transparent dielectric layer 2, the refractive index of the electro-refractive index adjusting layer 3 to the blue light transmitted through the electro-refractive index adjusting layer can be adjusted, and the refractive index of the electro-refractive index adjusting layer 3 to the blue light transmitted through the electro-refractive index adjusting layer can be converted to be higher or lower than the refractive indexes of the first transparent dielectric layer 1 and the second transparent dielectric layer 2 to the blue light, respectively, so that a blue light-blocking structure is formed. The blue light-blocking structure obtained by the manufacturing method provided by the embodiment can prevent the blue light of different wavelengths, and can turn on and turn off the blue light-blocking function and adjust the blue light-blocking degree. The principle of the blue light-blocking structure may refer to the description in the embodiment about the blue light-blocking structure. No further description will be repeated here.

The example shows the case that the first electrode 5 and the second electrode 4 are overlapped with the entire electro-refractive index adjusting layer 3, however, in other examples of the embodiment, the first electrode 5 and the second electrode 4 may be overlapped with part of electro-refractive index adjusting layer 3.

An embodiment provides a method for operating a display device, which comprises: providing a display device, in which the display device includes any foregoing blue light-blocking structure; and changing the refractive index of the electro-refractive index adjusting layer to the blue light at different wavelengths by adjusting a voltage applied to the first side and the second side of the electro-refractive index adjusting layer, and turning on the blue light-blocking function or turning off the blue light-blocking function or adjusting the transmittance of the blue light.

For instance, in an example of the embodiment, when no electrical field is applied, the refractive indexes of the electro-refractive index adjusting layer 3, the first transparent dielectric layer 1 and the second transparent dielectric layer 2 to the blue light are substantially equal to each other;

and when an electrical field is applied, the refractive index of the electro-refractive index adjusting layer 3 to the blue light may be increased with the increasement of the electrical field intensity. In this case, when no electrical field is applied to the electro-refractive index adjusting layer 3, the refractive index of the electro-refractive index adjusting layer 3, the refractive index of the first transparent dielectric layer 1 and the refractive index of the second transparent dielectric layer 2 are substantially consistent, so the film system including the electro-refractive index adjusting layer 3, the first transparent dielectric layer 1 and the second transparent dielectric layer 2 does not have reflection enhancing function and the blue light-blocking function is not turned on. When an electrical filed is applied to the electro-refractive index adjusting layer 3, the refractive index of the electro-refractive index adjusting layer 3 to the blue light is increased with the increasement of the electrical field intensity and will be greater than the refractive indexes of the first transparent dielectric layer 1 and the second transparent dielectric layer 2 on the two sides of the electro-refractive index adjusting layer, respectively, which is equivalent to the case that the refractive indexes of the dielectrics on the two sides of the layer are less than the refractive index of the layer, respectively. At this point, the film system formed by the electro-refractive index adjusting layer 3, the first transparent dielectric layer 1 and the second transparent dielectric layer 2 forms a reflection enhancing film system. The embodiment can change the refractive index of the electro-refractive index adjusting layer 3 by changing the voltage applied to the electro-refractive index adjusting layer 3, change the optical path difference between the two successive beams, and then change the reflectivity of the blue light-blocking structure to the blue light. When the total optical path difference between the two successive beams is $(2N+1)\lambda_0 (N=0, 1, 2 \ldots )$, the blue light with the wavelength $\lambda_0$ gets strong reflection on each film or layer, and at this point, the blue light-blocking effect is the strongest. In the blue light-blocking state, when a reverse voltage is applied, the reversible recovery of the optical properties of the electro-refractive index adjusting layer 3 can be realized, so the blue light-blocking effect can be turned off.

For instance, in another example of the embodiment, when no electrical field is applied to the electro-refractive index adjusting layer 3, the refractive index of the electro-refractive index adjusting layer 3 to the blue light is less than the refractive indexes of the first transparent dielectric layer 1 and the second transparent dielectric layer 2 to the blue light, respectively; and when an electrical field is applied to the electro-refractive index adjusting layer 3, the refractive index of the electro-refractive index adjusting layer 3 to the blue light can be increased with the increasement of the electrical field intensity and can be equal to or greater than the refractive indexes of the first transparent dielectric layer 1 and the second transparent dielectric layer 2 to the blue light, respectively. In this case, when no electrical field is applied to the electro-refractive index adjusting layer 3, the refractive index of the electro-refractive index adjusting layer 3 to the blue light is less than the refractive indexes of the layers on the two sides thereof, respectively, which is equivalent to the case that the refractive indexes of the dielectrics on the two sides of the layer are respectively greater than the refractive index of the layer. At this point, the electro-refractive index adjusting layer 3, the first transparent dielectric layer 1 and the second transparent dielectric layer 2 form the reflection enhancing film system, and the blue light-blocking function is turned on. When the electrical field is applied to the electro-refractive index adjusting layer 3, with the increasement of the voltage, the refractive index of the electro-refractive index adjusting layer 3 to the blue light is increased, and the transmittance of blue light is also changed with the change of the optical path difference. When the refractive index of the electro-refractive index adjusting layer is increased to be equal to the refractive indexes of the first transparent dielectric layer 1 and the second transparent dielectric layer 2, respectively, the film system does not have reflection enhancing function, and the blue light-blocking function is turned off. When the refractive index of the electro-refractive index adjusting layer 3 to the blue light is increased to be greater than the refractive indexes of the first transparent dielectric layer 1 and the second transparent dielectric layer 2, respectively, it is equivalent to the case that the refractive indexes of the dielectrics on the two sides of the layer are less than the refractive index of the layer, respectively. At this point, the electro-refractive index adjusting layer 3, the first transparent dielectric layer 1 and the second transparent dielectric layer 2 form the reflection enhancing film system, and the blue light-blocking function can also be turned on. Moreover, within a given range, with the increasement of the voltage, the refractive index of the electro-refractive index adjusting layer 3 to the blue light is increased, and the transmittance of the blue light is also changed with the change of the optical path difference. Similarly, when the total optical path difference between the two successive beams is $(2N+1)\lambda_0 (N=0, 1, 2 \ldots )$, the blue light with the wavelength $\lambda_0$ gets strong reflection on each layer, and at this point, the blue light-blocking effect is the strongest. In the blue light-blocking state, when a reverse voltage is applied, the reversible recovery of the optical properties of the electro-refractive index adjusting layer 3 can be realized, so the blue light-blocking effect can be turned off.

In this way, the blue light-blocking adjustment method may be adopted to turn on and turn off the blue light-blocking function of the display device and adjust the transmittance of blue light.

The foregoing is only the exemplary embodiments of the present disclosure, and the scope of the present disclosure is not limited thereto. A person of ordinary skill in the art can make various changes and modifications without departing from the spirit of the present disclosure, and such changes and modifications shall fall into the scope of the present disclosure.

What is claimed is:

1. A display device, comprising a blue light-blocking structure and a display panel, wherein
  the blue light-blocking structure is provided in the display panel,
  the display panel comprises an array substrate, the array substrate comprising a base substrate and a display driver circuit layer, and the blue light-blocking structure being provided between the base substrate and the display driver circuit layer, and
  the blue light-blocking structure comprises:
  a first transparent dielectric layer;
  a second transparent dielectric layer provided on a side of the first transparent dielectric layer; and
  an electro-refractive index adjusting layer provided between the first transparent dielectric layer and the second transparent dielectric layer,
  wherein the electro-refractive index adjusting layer is configured to change the refractive index to blue light transmitted through the electro-refractive index adjusting layer under the action of an electrical field applied between a first side of the electro-refractive index adjusting layer near the first transparent dielectric layer and a second side near the second transparent dielectric layer.

2. The display device according to claim 1, wherein the refractive index of the electro-refractive index adjusting layer to the blue light under the condition of not applying the electrical field is substantially equal to the refractive indexes of the first transparent dielectric layer and the second transparent dielectric layer to the blue light, respectively; and the refractive index of the electro-refractive index adjusting layer to the blue light under the action of the applied electrical field is increased with the increasement of the electrical field intensity.

3. The display device according to claim 1, wherein the refractive index of the electro-refractive index adjusting layer to the blue light under the condition of not applying the electrical field is less than the refractive index of the first transparent dielectric layer to the blue light and less than the refractive index of the second transparent dielectric layer to the blue light; and the refractive index of the electro-refractive index adjusting layer to the blue light under the action of the applied electrical field is increased with the increasement of the electrical field intensity.

4. The display device according to claim 1, further comprising:

a first electrode provided on a side of the first transparent dielectric layer away from the electro-refractive index adjusting layer, and a second electrode provided on a side of the second transparent dielectric layer away from the electro-refractive index adjusting layer, wherein the first electrode and the second electrode are configured to apply the electrical field to the electro-refractive index adjusting layer.

5. The display device according to claim 1, wherein the first transparent dielectric layer is multiplexed as a first electrode; the second transparent dielectric layer is multiplexed as a second electrode; and the first electrode and the second electrode are configured to apply the electrical field to the electro-refractive index adjusting layer.

6. The display device according to claim 1, wherein the electro-refractive index adjusting layer comprises material comprising inorganic electrochromic material, or organic electrochromic material.

7. The display device according to claim 6, wherein the material of the electro-refractive index adjusting layer comprises pyrazoline, viologen or phosphotungstic acid.

8. The display device according to claim 1, further comprising a display panel, wherein the blue light-blocking structure is provided on a light-emergent side or a light incident side of the display panel.

9. The display device according to claim 1, further comprising a display panel and a backlight provided on a light incident side of the display panel, wherein the blue light-blocking structure is provided between the backlight and the display panel.

10. The display device according to claim 1, wherein the display panel comprises a plurality of pixel units, each pixel unit comprising a red subpixel, a green subpixel and a blue subpixel, and the electro-refractive index adjusting layer being arranged corresponding to the blue subpixel.

11. The display device according to claim 1, further comprising:

a control circuit configured to control the intensity of the electrical field applied to the electro-refractive index adjusting layer.

12. The display device according to claim 9, further comprising: an insulating layer provided between the blue light-blocking structure and the display panel.

13. The display device according to claim 1, further comprising: an insulating layer provided between the display driver circuit layer and the display panel.

14. A method for operating a display device, comprising:
providing the display device according to claim 1; and
changing the refractive index of the electro-refractive index adjusting layer to the blue light by adjusting a voltage applied between the first side and the second side of the electro-refractive index adjusting layer, and turning on a blue light-blocking function, or turning off the blue light-blocking function, or adjusting and controlling the transmittance of blue light.

15. A method for manufacturing a display device comprising a blue light-blocking structure and a display panel, comprising:

manufacturing a blue light-blocking structure, comprising:

forming a first transparent dielectric layer;

forming an electro-refractive index adjusting layer on a side of the first transparent dielectric layer; and forming a second transparent dielectric layer on a side of the electro-refractive index adjusting layer, wherein when an electrical field is applied between a first side near the first transparent dielectric layer and a second side near the second transparent dielectric layer, the refractive index of the electro-refractive index adjusting layer to blue light transmitted through the electro-refractive index adjusting layer is adjusted, to allow the refractive index of the electro-refractive index adjusting layer to the blue light transmitted through the electro-refractive index adjusting layer to be converted to be higher or lower than the refractive indexes of the first transparent dielectric layer and the second transparent dielectric layer to the blue light, respectively, wherein the blue light-blocking structure is provided in the display panel, and the display panel comprises an array substrate, the array substrate comprising a base substrate and a display driver circuit layer, and the blue light-blocking structure being provided between the base substrate and the display driver circuit layer.

16. The method for manufacturing the display device according to claim 15, wherein the manufacturing the blue light-blocking structure further comprising:

forming a first electrode on a side of the first transparent dielectric layer away from the electro-refractive index adjusting layer; and forming a second electrode on a side of the second transparent dielectric layer away from the electro-refractive index adjusting layer.

17. The method for manufacturing the display device according to claim 15, wherein the first transparent dielectric layer is multiplexed as a first electrode; the second transparent dielectric layer is multiplexed as a second electrode; and the first electrode and the second electrode are configured to apply the electrical field to the electro-refractive index adjusting layer.

* * * * *